(12) United States Patent
Kawasaki et al.

(10) Patent No.: US 6,536,673 B1
(45) Date of Patent: Mar. 25, 2003

(54) CIRCUIT FOR DETECTING PRESENCE OR ABSENCE OF PROXIMITY IC CARD DEVICE

(75) Inventors: Yusuke Kawasaki, Kawasaki (JP); Yoshiyasu Sugimura, Kawasaki (JP); Shigeru Hashimoto, Kawasaki (JP)

(73) Assignee: Fijitsu Limited, Kawasaki (JP)

( * ) Notice: Subject to any disclaimer, the term of this patent is extended or adjusted under 35 U.S.C. 154(b) by 0 days.

(21) Appl. No.: 09/504,380

(22) Filed: Feb. 15, 2000

(30) Foreign Application Priority Data

Jul. 29, 1999 (JP) .......................... 11-215375

(51) Int. Cl.⁷ .................. G06K 19/06; G06K 5/00
(52) U.S. Cl. .................. 235/492; 235/380; 235/382
(58) Field of Search ...................... 235/375, 380, 235/451, 492, 382, 462.48, 462.25

(56) References Cited

U.S. PATENT DOCUMENTS

| | | | | |
|---|---|---|---|---|
| 5,113,184 A | * | 5/1992 | Katayama | 340/825.54 |
| 5,225,667 A | * | 7/1993 | Furuta et al. | 235/492 |
| 5,378,887 A | * | 1/1995 | Kobayashi | 235/492 |
| 5,418,353 A | | 5/1995 | Katayama et al. | 235/380 |
| 5,594,384 A | | 1/1997 | Carroll et al. | 324/369 |
| 5,874,725 A | * | 2/1999 | Yamaguchi | 235/439 |
| 5,889,273 A | * | 3/1999 | Goto | 235/492 |
| 5,966,404 A | * | 10/1999 | Yokota et al. | 375/219 |
| 6,021,951 A | * | 2/2000 | Nishiikawa | 235/494 |
| 6,152,373 A | * | 11/2000 | Roberts et al. | 235/492 |

FOREIGN PATENT DOCUMENTS

| | | | | |
|---|---|---|---|---|
| JP | 404047389 A | * | 2/1992 | 235/487 |
| JP | 10013312 | | 1/1998 | |
| JP | 10-269331 | | 10/1998 | |

OTHER PUBLICATIONS

Preliminary Search Report.

* cited by examiner

Primary Examiner—Thien M. Le
Assistant Examiner—April A. Nowlin
(74) Attorney, Agent, or Firm—Armstrong, Westerman & Hattori, LLP

(57) ABSTRACT

A circuit, of a simple structure, for detecting the presence or absence of a proximity IC card (PICC) in a proximity coupling device (PCD) which transmits data to and receives data from the PICC. This circuit includes an antenna for receiving a carrier signal outputted to a proximity IC card, a D.C. detecting device for rectifying a carrier signal received from the antenna and for detecting a D.C. component of the received carrier signal, and a level judgment device for determining the level of the D.C. component detected by the D.C. detecting device and for judging, when the level of the direct component is within a predetermined range that a proximity IC card is present in an RF field.

7 Claims, 7 Drawing Sheets

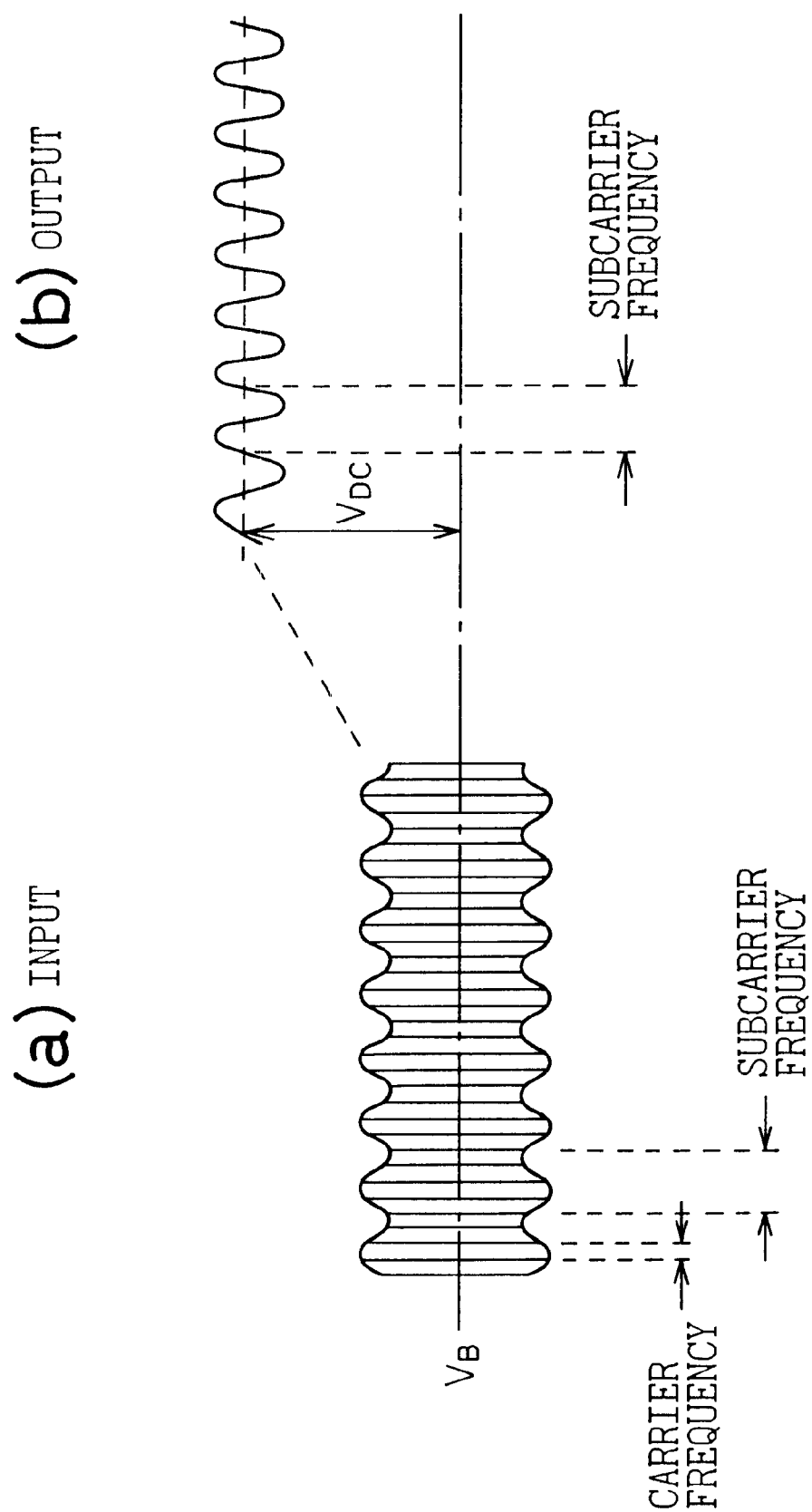

| LEVEL OF SIGNAL "IN" | OL | OM | OH |
|---|---|---|---|
| NOT LESS THAN V1 | 0 | 0 | 1 |
| LESS THAN V1 & MORE THAN V2 | 0 | 1 | 0 |
| NOT MORE THAN V2 | 1 | 0 | 0 |

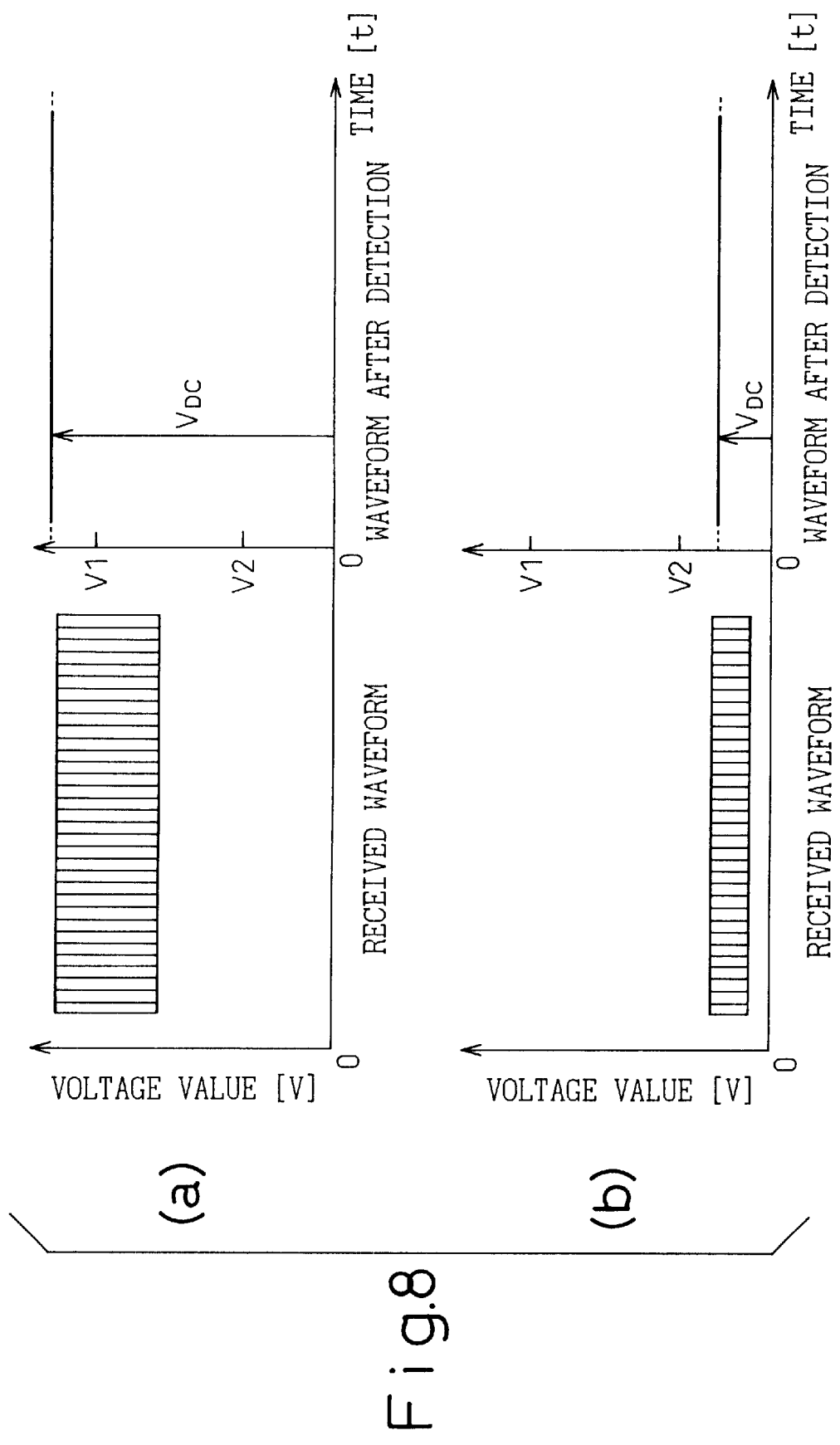

CIRCUIT FOR DETECTING PRESENCE OR ABSENCE OF PROXIMITY IC CARD DEVICE

BACKGROUND OF THE INVENTION

1. Field of the Invention

The present invention generally relates to a proximity IC card (hereunder sometimes abbreviated to "PICC") and, more particularly, to a circuit for detecting the presence or absence of a PICC in a PICC reader/writer (hereunder abbreviated as PICC-R/W) for writing data to and reading data from the PICC.

2. Description of the Related Art

PICC standards are described in ISO/IEC (International Organization for Standardization/International Electrotechnical Commission) 14443. Hereinafter, in relation to the present invention, a brief description is given about part of ISO/IEC 14443, which relates to a type-B communication interface for a PICC and which describes the properties and characteristics of a field that provides power transmission and bidirectional communication between a PICC and a proximity coupling device (hereunder abbreviated to PCD), such as the PICC-R/W.

(1) Power Transmission from PCD to PICC

To supply effective power to the PICC in a radio frequency (RF) operating field, a carrier (having a carrier frequency of $f_c$=13.56 MHz) is transmitted from the PCD to the PICC, whereupon the received carrier is rectified to thereby generate electric power needed for an operation of an internal circuit.

(2) Communication from PCD to PICC

The PCD transmits data to the PICC by amplitude-shift-keying (ASK) modulating the amplitude of the carrier with a modulation index of 10% at a data bit rate of 106 Kbps (=$f_c$/128).

(3) Communication from PICC to PCD

The PICC transmits data to the PCD by performing load modulation of a load for reception of the carrier at a frequency $f_a$ (=$f_c$/16), which is (1/16) the carrier frequency, to thereby generate a subcarrier (whose frequency $f_s$=847 kHz), and by then binary-phase-shift-keying (BPSK) modulating the phase of the subcarrier at a data bit rate of 106 Kbps (=$f_c$/128).

FIG. 1 schematically shows the constitution of an example of a PICC.

In the case of the example of FIG. 1, two chips respectively constituting a central processing unit (CPU) portion 11 and an RF portion 12 are incorporated into a card body 10. Further, an antenna (AT) 13, wound like a coils is disposed along the periphery of the card body 10. The CPU portion 11 is constituted by what is called a one-chip computer and includes a CPU, memories such as a ROM, a RAM, and an EEPROM, and an input/output (I/O) interface.

FIG. 2 shows the constitution of an example of the communication interface between a PCD and a PICC.

In the case of the communication from the PCD to the PICC, which has been described in the foregoing section (2), a modulation portion (MOD) 20 of the PCD performs ASK modulation of the amplitude of a carrier (having the carrier frequency of $f_c$=13.56 MHz) with a modulation index of 10%. Then, a resultant signal is transmitted from the PCD to the PICC through output amplifiers 22 and 23 and an antenna 24.

In contrast, in the case of the communication from the PICC to the PCD, which has been described in the foregoing section (3), a load 27 for reception of an RF signal is varied under the control of a modulation portion (MOD) 29 of the RF portion 12 of the PICC shown in FIG. 1. Then, a BPSK modulation for providing binary phase information (representing 0 or 180 degrees) is performed on a subcarrier (whose frequency $f_s$=847 kHz) generated by a load modulation (resulting in an amplitude modulation (hereunder referred to as an AM modulation)).

The modulated signal is transmitted to the PCD through an antenna 26 (corresponding to the antenna 13 of FIG. 1). Actually, a detection portion (DET) 21 of the PCD detects the carrier that is outputted by the PCD itself and that undergoes the load modulation (including the BPSK modulation) performed by the PICC, as illustrated in FIG. 2.

A photosensor portion 25 of the PCD is used for verifying the presence of the PICC within a communication range of the PCD. For example, the photosensor portion is provided in a card detector of the PCD, and adapted to detect a PICC, which passes through a card insertion portion or which is placed in a card slot, by using optical components, such as a photodiode.

As described above, in the conventional communication interface circuit, means for verifying the presence of a PICC within the communication range of a PCD is provided as a circuit using an optical component other than a data transmitting/receiving circuit. Thus, the conventional communication interface circuit has drawbacks in that the cost of components thereof increases and that the component mounting space thereof is limited. However, in recent years, PICCs have come into wide use, so that PICCs now cover a wide field of application. It is eagerly requested that the size and cost of not only PICCs but PICC-R/W are decreased as much as possible. Thus, first, it is necessary to reduce the number of components as much as possible.

Furthermore, if an iron plate is used instead of a PICC, conventional PICC detecting means comprising the photosensor portion 25 determines that a PICC is present.

In this case, spatial impedance within the RF field becomes extraordinarily low owing to the presence of an electric conductor or a magnetic substance, such as the iron plate. Consequently, the conventional communication interface circuit has a drawback in that the PICC-R/W outputs excessive carriers, and thus electronic components are damaged after the output of the carriers.

Thus, the conventional communication interface circuit has an additional circuit 25' that is used for discriminating the card and that is dedicated to discrimination of a PICC from other electric conductors and magnetic substances. This results in a rise of the aforementioned cost of components, and in an increase in the limitation on the mounting space.

SUMMARY OF THE INVENTION

Accordingly, in view of the aforementioned drawbacks of the conventional detection circuit, an object of the present invention is to provide a circuit for detecting the presence or absence of a PICC, which simultaneously performs both the detection of the presence or absence of a PICC and the discrimination of the PICC by using a simple circuit structure formed in such a manner as to be integral with the existing detection part (DET) 21 of a data transmitting/receiving portion, different from the conventional communication interface circuit in which the circuit 25 dedicated to the detection of the presence or absence of a PICC is formed in such a way as to be separated from the circuit 25' dedicated to the discrimination of a PICC.

To achieve the foregoing object, according to the present invention, there is provided a circuit for detecting the presence or absence of a proximity IC card. This circuit comprises an antenna for receiving a carrier signal outputted to a proximity IC card, D.C. detecting means for rectifying a carrier signal received from the antenna and for detecting a D.C. component of the received carrier signal, and level judgment means for determining the level of the D.C. component detected by the D.C. detecting means and for judging, when the level of the D.C. component is within a predetermined range, that a proximity IC card is present in an RF field.

Further, the D.C. detecting means is a detection circuit for detecting a subcarrier signal that is sent from a proximity IC card and superposed onto the carrier signal. The detection circuit outputs the D.C. component and the subcarrier signal superposed thereonto as rectification outputs obtained by rectification of the carrier signal.

Furthermore, the detection circuit comprises a bias circuit for applying predetermined D.C. potential to a signal received from the antenna, a rectifier circuit for extracting a subcarrier signal superposed onto the carrier signal by rectifying a signal received from the antenna at the D.C. bias point, and an amplifier circuit for amplifying the subcarrier signal extracted at the D.C. bias point.

Moreover, the level judgment means is operative to judge, when the level of the D.C. component sent from the detection circuit is not less than a first level, that a proximity IC card is not in the RF field. Furthermore, the level judgment means is operative to judge, when the level of the D.C. component sent from the detection circuit is not more than the first level and not less than a second level, that a proximity IC card is present in the RF field. Further, the level judgment means is operative to judge, when the level of the D.C. component sent from the detection circuit is not more than the second level, that an object other than the proximity IC card is present in the RF field.

Additionally, the level judgment means has thresholds of a Schmitt trigger type for preventing variation in result of judgment on the level in the case when the level of the D.C. component is in the vicinity of the first or second level. Alternatively, the level judgment means has a judgment mask timer circuit, whose masking time is not less than the period of the subcarrier signal, for preventing a variation in a result of judgment on the level in such a case.

The circuit for detecting presence or absence of a proximity IC card is provided in the proximity coupling device.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 5 is a diagram illustrating an example of input and output waveforms of the card detecting circuit portion of FIG. 4;

FIG. 8 is a waveform diagram illustrating an example (2) of the typical signal waveform for judging the presence or absence of a PICC.

DETAILED DESCRIPTION OF THE PREFERRED EMBODIMENTS

Figure 1:
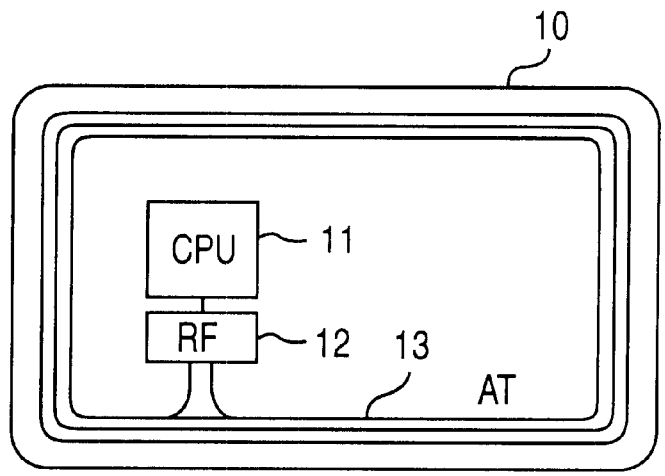
FIG. 1 is a diagram schematically illustrating the constitution of an example of a PICC.
Figure 2:
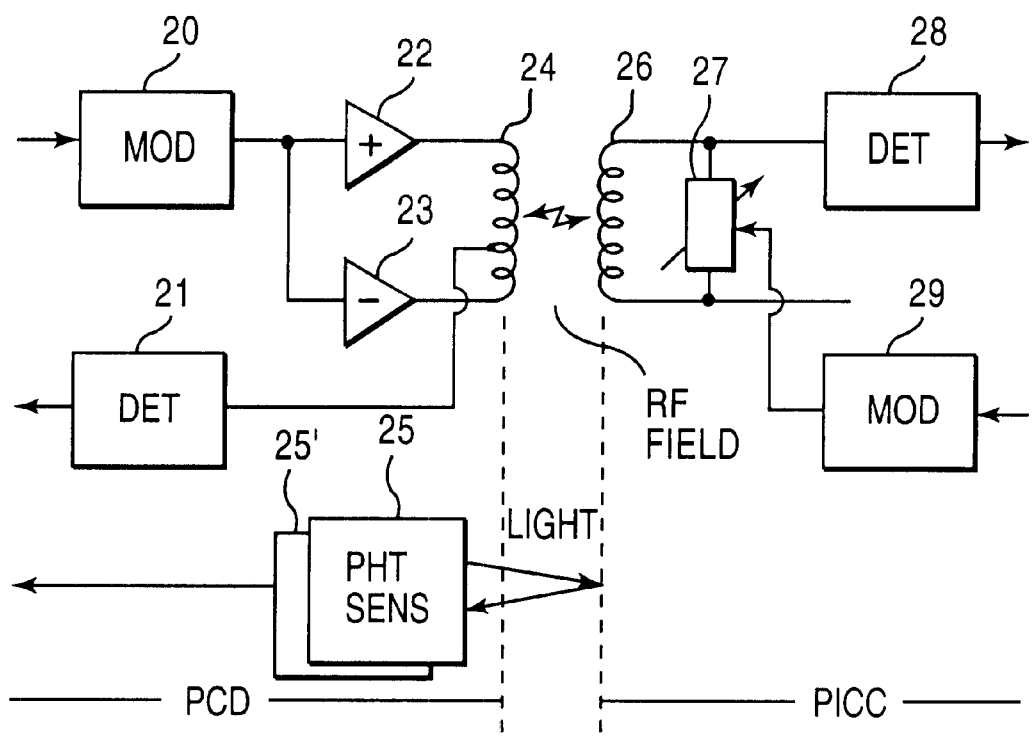
FIG. 2 is a diagram illustrating an example of the communication interface between a PCD and a PICC.
Figure 3:
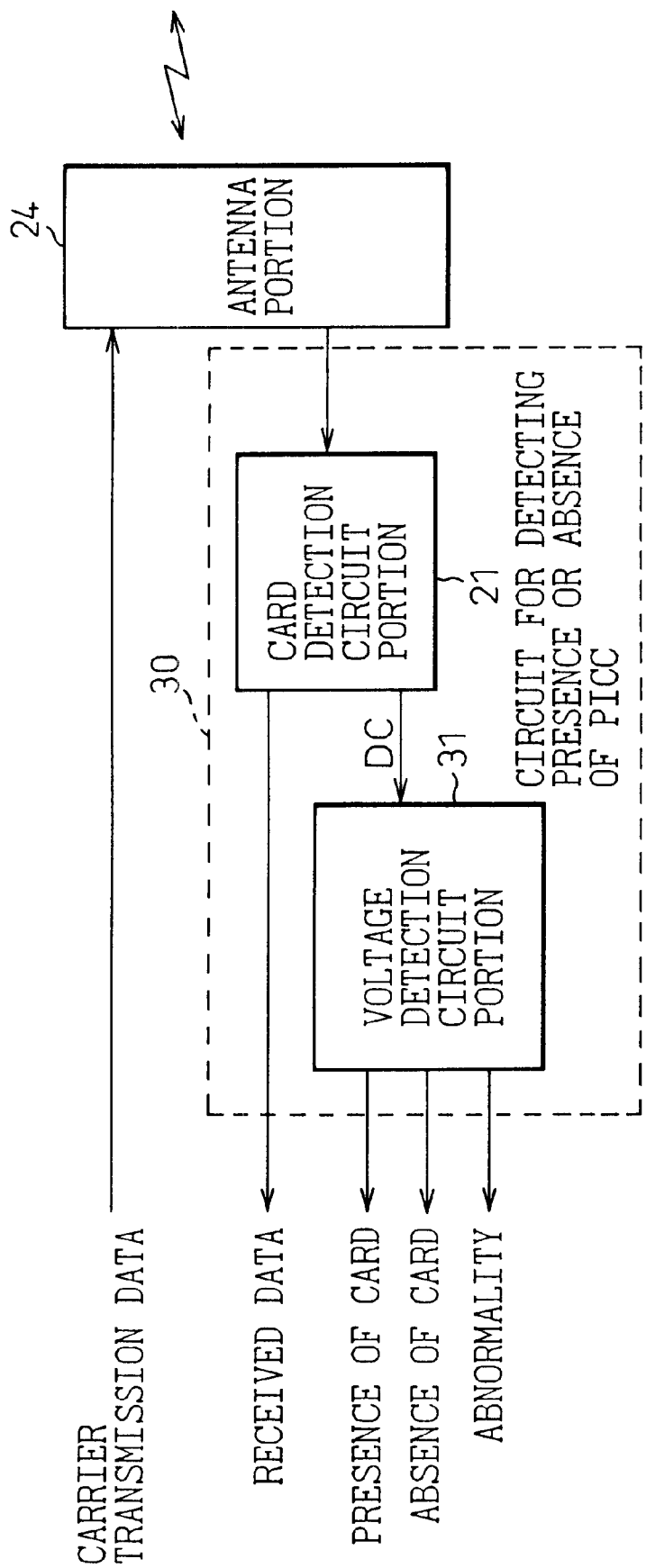
FIG. 3 is a diagram illustrating the basic constitution of an example of a circuit for detecting the presence or absence of a PICC according to the present invention.

FIG. 3 shows the basic constitution of an embodiment of a circuit for detecting the presence or absence of a PICC according to the present invention.

As shown in FIG. 3, a circuit 30 for detecting the presence or absence of a PICC according to the present invention comprises a circuit (namely, a card detection circuit portion) 21 for detection of a subcarrier, which corresponds to an existing detection portion 21, and a level judgment circuit (namely, a voltage detection circuit portion) 31 for determining the level of a carrier rectification output (DC) obtained by rectifying the carrier when the detection of the subcarrier is performed. In this embodiment, the detection of the presence or absence of a PICC and the discrimination thereof are performed by utilizing the carrier rectification output from the card detection circuit portion 21 and by determining the level thereof in the voltage detecting circuit portion 31.

Therefore, the circuit 30 for detecting the presence or absence of a PICC according to the present invention is regarded as being obtained by adding the function of detection of the presence or absence of a PICC and that of discrimination thereof to the existing detection portion 21. This circuit 30 provides all of the following signals:

1) a subcarrier representing received data;
2) a signal indicating the presence or absence of a card; and
3) a signal indicating abnormality due to the presence of an electric conductor or a magnetic substance.

Hereinafter, an operation of an embodiment of the present invention will be described in detail.

Figure 4:
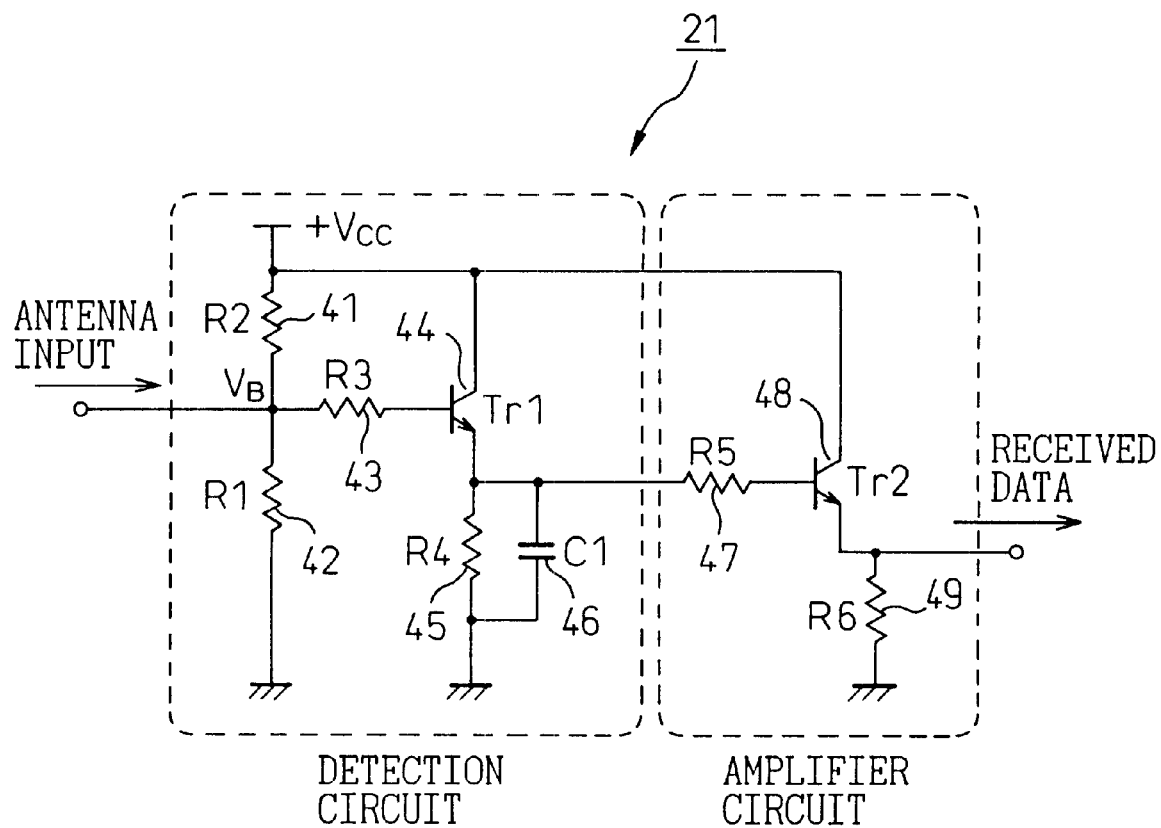
FIG. 4 is a diagram illustrating an embodiment of a card detecting circuit portion of FIG. 3.

FIG. 4 shows an embodiment of the card detection circuit portion of FIG. 3. Further, FIG. 5 shows an example of the waveform of an input signal to and an output signal from the card detection circuit portion of FIG. 4.

As shown in (a) of FIG. 5, in the case that a PICC is placed between the card detection circuit portion and the PICC-R/W and within a range in which the PICC-R/W is communicatable with the PICC, and that the PICC transmits no communication data, the antenna 24 receives a signal obtained by superposing a subcarrier (having a subcarrier frequency $f_S$=847 kHz), which is not BPSK-modulated, onto a carrier signal (having a carrier frequency $f_C$=13.56 MHz).

In the detection circuit of FIG. 4, a fixed bias potential $V_B$ obtained by dividing a power supply voltage by a resistor (R1) 42 and a resistor (R2) 41 is applied to the received signal. This fixed bias potential $V_B$ causes an extremely weak current to be fed to the base of a transistor (Tr1) 44 at all times, so that an operation of the transistor in a linear region is ensured regardless of the level of the input signal.

The transistor 44 operates as both of an input buffer and a rectifier diode. A rectifier circuit for performing a half-wave rectification on a carrier signal (having a carrier frequency $f_C$=13.56 MHz) consists of the transistor 44, a resistor (R4) 45, and a capacitor (C1) 46. A rectification output of the rectifier circuit is amplified by an amplifier circuit of the next stage, as shown in (b) of FIG. 5. Then, the amplified signal is outputted therefrom. Incidentally, a D.C. potential indicated by "$V_{DC}$" is used for judging the presence or absence of a PICC, as will be described later. This is because of the facts that a signal receiving a voltage developed across the antenna 4 varies depending upon whether or not a PICC is present within a range in which the PICC is communicatable with the PICC-R/W and that, thus, a D.C. potential $V_{DC}$, which is a D.C. component of the output of the detection circuit, inevitably varies depending thereupon.

That is, 1) when a PICC is absent therein, the spatial impedance rises, so that the D.C. potential $V_{DC}$ increases. 2) Conversely, when a PICC is present in the RF field, the spatial impedance is within a predetermined range, so that the D.C. potential $V_{DC}$ is within a predetermined range. 3) Further, when, for example, an iron plate is present therein, the spatial impedance becomes extremely low, so that low D.C. potential $V_{DC}$ is obtained. Incidentally, a subcarrier component of the output signal of the amplifier circuit serving as received data is BPSK-modulated in a demodulation portion of a rear stage (not shown).

Figures 6A, 6B:
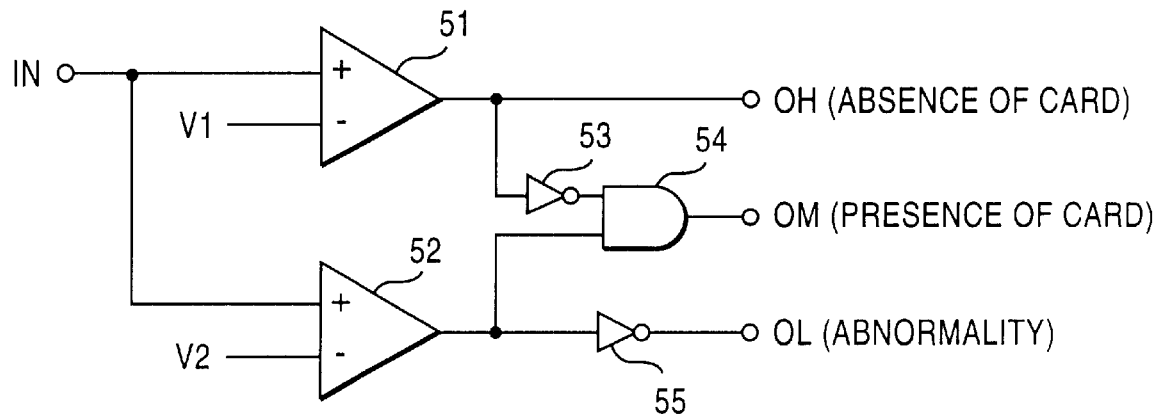
FIG. 6A is a diagram illustrating an embodiment of a voltage detecting circuit portion of FIG. 3.
FIG. 6B is a truth table illustrating a logical judgment operation of the circuit of FIG. 6A.

FIGS. 6A and 6B show an embodiment of the voltage detection circuit portion of FIG. 3.

Figure 7:
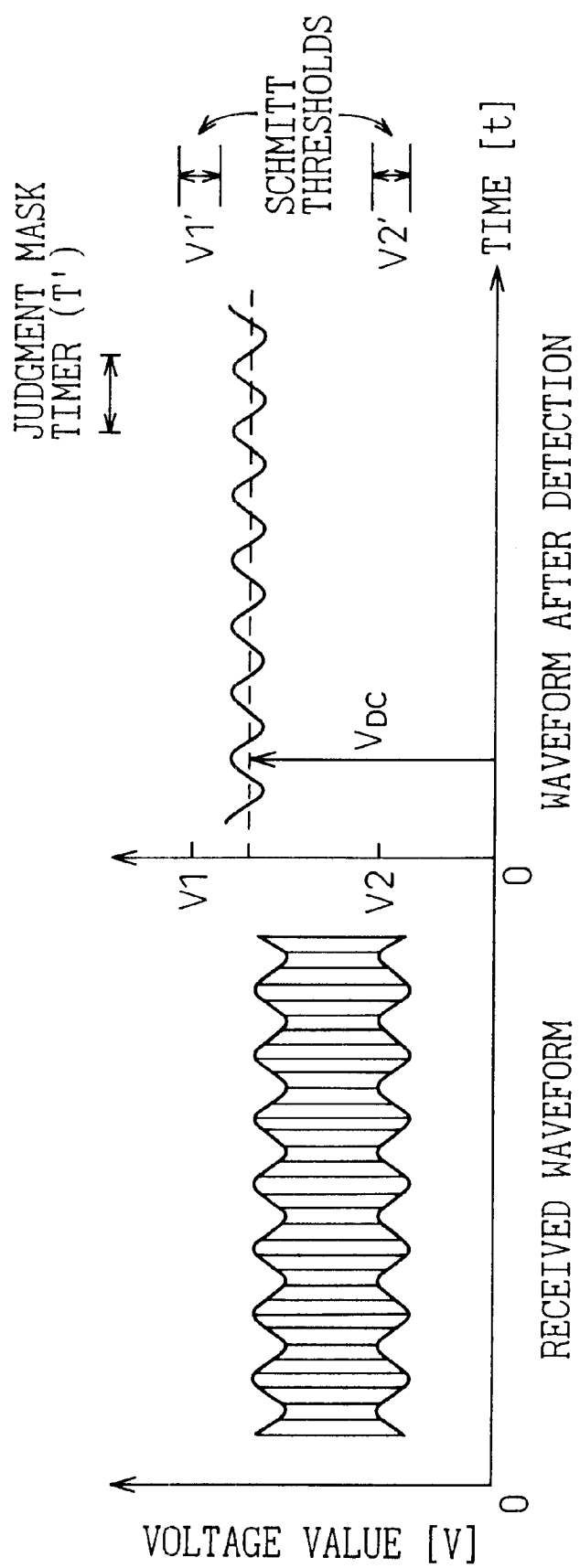
FIG. 7 is a waveform diagram illustrating an example (1) of a typical signal waveform for judging the presence or absence of a PICC.

Further, FIGS. 7 and 8 show examples of typical waveforms of signals from which the presence or absence of a PICC is judged by the voltage detection circuit portion.

FIG. 6A illustrates an instance of a circuit for describing the function, operation and scale of the voltage detection circuit portion which is actually constituted by an IC, a transistor circuit, or a PLA.

In the circuit portion of FIG. 6A, a signal (see (b) of FIG. 5) coming from the detection circuit is inputted to comparators 51 and 52, to which different thresholds V1 and V2 are allocated, respectively. The threshold $V_1$ of the comparator 51 provides a judgment signal level for discriminating between the case of the absence of a PICC (corresponding to the case that $V_{DC} > V_1$) and the case of the presence thereof (corresponding to the case that $V_{DC} < V_1$), as shown in FIG. 7 and (a) of FIG. 8. Further, the threshold $V_2$ of the comparator 52 provides a judgment signal level for discriminating between the case of the presence of a PICC (corresponding to the case that $V_{DC} > V_2$) and the case of the detection of a foreign object (namely, an electric conductor or a magnetic substance), such as an iron plate, (corresponding to the case that $V_{DC} < V_2$), as shown in FIG. 7 and (b) of FIG. 8.

FIG. 6B illustrates a logical judgment operation of the circuit of FIG. 6A.

In the case that the level (namely, the D.C. potential $V_{DC}$) of an input signal is more than $V_2$ and less than $V_1$ (that is, $V_2 < V_{DC} < V_1$), a signal OM (indicating the presence of a card) represents "1". In this case, it is indicated that a PICC is present within the RF field. The circuit of FIG. 6A receives carrier signals having signal levels that are within a predetermined range of levels corresponding to the values of the spatial impedance of the RF field. The output level $V_{DC}$ of the portion having performed the detection and rectification of such a carrier signal is within the range between the thresholds $V_1$ and $V_2$ (that is, $V_2 < V_{DC} < V_1$), as shown in FIG. 7. Thus, this circuit receives a signal obtained by superposing a subcarrier signal onto the carrier signal.

In the case that the level $V_{DC}$ of an input signal is not less than $V_1$ (that is, $V_1 \leq V_{DC}$), a signal OH (indicating the absence of a card) represents "1". In this case, it is indicated that a PICC is not in the RF field. Further, the spatial impedance of the RF field rises. Thus, the output level $V_{DC}$ of the portion having performed the detection and rectifica-tion of the input carrier signal is not less than $V_1$ (that is, $V_1 \leq V_{DC}$), as shown in (a) of FIG. 8. Moreover, a PICC placed outside the RF field is not activated. Thus, no subcarrier signals are sent from the PICC. Consequently, the output of the portion having rectified the carrier signal is a nearly D.C. signal.

In the case that the level $V_{DC}$ of an input signal is not more than $V_2$ (that is, $V_{DC} \leq V_2$), a signal OL (indicating abnormality) represents "1". In this case, the presence of a foreign object (for example, an electric conductor or a magnetic substance), such as an iron plate, is detected from an extremely large drop in the spatial impedance of the RF field. As shown in (b) of FIG. 8, the output level $V_{DC}$ of the portion having performed the detection and rectification of the received carrier signal is not more than $V_2$ (that is, $V_{DC} \leq V_2$) Moreover, naturally, .no subcarrier signals are sent from the PICC. Consequently, the output of the portion having rectified the received carrier signal is an approximate D.C. signal.

Thus, according to the present invention, an ordinary electronic circuit of an extremely simple structure is able to judge the presence or absence of a PICC and to detect a foreign object (such as an electric conductor or a magnetic substance). In the former case, the present invention eliminates the necessity for providing a special circuit, such as an optical component, in the circuit for detecting the presence or absence of a PICC. In the latter case, the present invention eliminates the need for a special circuit for detecting a foreign object. Incidentally, when a foreign object (such as an electric conductor or a magnetic substance) is detected, for instance, a control operation for restricting an output of carriers is performed in response to a signal indicating that a foreign object is detected. This prevents components, such as amplifiers, of a signal transmitting stage from being damaged by an electric overcurrent.

Furthermore, as simply shown in FIG. 7, in the case that a rectified waveform includes a subcarrier component, and that the D.C. component $V_{DC}$ is close to the threshold $V_1$ or $V_2$, there is a fear that the logic values or levels shown in the table of FIG. 6B are unstably obtained. The following measures may be taken against this so as to prevent variation in result of a level judgment within one period of the input signal. For example, the thresholds $V_1'$ and $V_2'$ of a simple Schmitt circuit are employed as the thresholds $V_1$ and $V_2$. Alternatively, a mask timer (whose masking time T' is equal to the period of a subcarrier) is provided in the circuit.

As described above, according to the present invention, there is provided a circuit for detecting the present or absence of a PICC, which detects the presence or absence of a PICC by using a simple circuit formed in such a manner as to be integral with the existing detection portion (DET) 21 and which simultaneously detects a PICC, in a PICC-R/W, without providing the circuit dedicated to the detection of the presence or absence of a PICC therein separately from the circuit dedicated to the detection of a PICC, different from the conventional circuit.

The circuit for detecting the presence or absence of a PICC according to the present invention uses rectified signals, which are outputted from an existing detection portion, and is constituted only by adding a simple electronic circuit to the existing detection portion. Thus, the circuit-formed in such a way as to be integral with the detection portion is easily realized by being constituted as an IC or by using a PLA. The circuit of the present invention meets the demand for reductions in the number, mounting areas and costs of components.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A circuit for detecting presence or absence of a proximity IC card, comprising:
    an antenna for outputting a carrier signal to a proximity IC card and for receiving a carrier signal outputted to a proximity IC card;
    D.C. detecting means for rectifying a carrier signal received from said antenna and for detecting a D.C. component of the received carrier signal; and
    level judgment means for determining a level of the D.C. component detected by said D.C. detecting means and for judging, when the level of the D.C. component is within a predetermined range, that a proximity IC card is present in an RF field.

2. The circuit for detecting presence or absence of a proximity IC card, according to claim 1, which is provided in a proximity coupling device.

3. A circuit for detecting presence or absence of a proximity IC card, comprising:
    an antenna for receiving a carrier signal outputted to a proximity IC card;
    D.C. detecting means for rectifying a carrier signal received from said antenna and for detecting a D.C. component of the received carrier signal; and
    level judgment means for determining a level of the D.C. component detected by said D.C. detecting means and for judging, when the level of the D.C. component is within a predetermined range, that a proximity IC card is present in an RF field,
    wherein said D.C. detecting means is a detection circuit for detecting a subcarrier signal that is sent from a proximity IC card and superposed onto the carrier signal, and wherein said detection circuit outputs the D.C. component and the subcarrier signal superposed thereonto as rectification outputs obtained by rectification of the carrier signal.

4. The circuit for detecting presence or absence of a proximity IC card, according to claim 3, wherein said detection circuit comprises:
    a bias circuit for applying predetermined D.C. potential to a signal received from said antenna;
    a rectifier circuit for extracting the D.C. component of the carrier signal and a subcarrier signal superposed thereonto by rectifying a signal received by and sent from said antenna at a bias point; and
    an amplifier circuit for amplifying the D.C. component and subcarrier signal extracted at the bias point.

5. A circuit for detecting presence or absence of a proximity IC card, comprising:
    an antenna for receiving a carrier signal outputted to a proximity IC card;
    D.C. detecting means for rectifying a carrier signal received from said antenna and for detecting a D.C. component of the received carrier signal; and
    level judgment means for determining a level of the D.C. component detected by said D.C. detecting means and for judging, when the level of the D.C. component is within a predetermined range, that a proximity IC card is present in an RF field,
    wherein said level judgment means is operative to judge, when the level of the D.C. component sent from said detection circuit is not less than a first level, that a proximity IC card is not in the RF field,
    wherein said level judgment means is operative to judge, when the level of the D.C. component sent from said detection circuit is not more than the first level and not less than a second level, that the proximity IC card is present in the RF field, and
    wherein said level judgment means is operative to judge, when the level of the D.C. component sent from said detection circuit is not more than the second level, that an object other than the proximity IC card is present in the RF field.

6. The circuit for detecting presence or absence of a proximity IC card, according to claim 5,
    wherein said level judgment means has two thresholds of different values for preventing a variation in the result of a judgment on the level when the level of the D.C. component is in vicinity of the first or second level, and
    wherein the smaller threshold is used for comparison with a decreasing level of the D.C. component and the larger threshold is used for comparison with an increasing level of the D.C. component.

7. The circuit for detecting presence or absence of a proximity IC card, according to claim 5, wherein said level judgment means has a judgment mask timer circuit, whose masking time is not less than a period of the subcarrier signal, for preventing variation in result of judgment on the level when the level of the D.C. component is in vicinity of the first or second level.

* * * * *

UNITED STATES PATENT AND TRADEMARK OFFICE
CERTIFICATE OF CORRECTION

PATENT NO. : 6,536,673 B1
DATED : March 25, 2003
INVENTOR(S) : Kawasaki et al.

It is certified that error appears in the above-identified patent and that said Letters Patent is hereby corrected as shown below:

<u>Title page</u>,
Item [73], Assignee, delete "Fijitsu Limited" and insert -- Fujitsu Limited --

Signed and Sealed this

Twenty-fifth Day of May, 2004

JON W. DUDAS
*Acting Director of the United States Patent and Trademark Office*